(12) United States Patent
D'Arcy

(10) Patent No.: US 9,994,265 B2
(45) Date of Patent: Jun. 12, 2018

(54) SPEED-ADAPTIVE WING FOR DRAG REDUCTION

(71) Applicant: Joseph D'Arcy, Rocky Hill, CT (US)

(72) Inventor: Joseph D'Arcy, Rocky Hill, CT (US)

( * ) Notice: Subject to any disclaimer, the term of this patent is extended or adjusted under 35 U.S.C. 154(b) by 19 days.

(21) Appl. No.: 14/993,474

(22) Filed: Jan. 12, 2016

(65) Prior Publication Data

US 2016/0121941 A1    May 5, 2016

Related U.S. Application Data

(63) Continuation-in-part of application No. 13/785,771, filed on Mar. 5, 2013, now Pat. No. 9,266,571.

(51) Int. Cl.
    *B62D 35/00* (2006.01)
    *G05D 3/10* (2006.01)

(52) U.S. Cl.
    CPC .............. *B62D 35/005* (2013.01); *G05D 3/10* (2013.01)

(58) Field of Classification Search
    CPC .................................. B62D 35/005; G05D 3/10
    USPC ...... 296/180.1, 180.5, 180.3, 180.2, 95.1, 96
    See application file for complete search history.

(56) References Cited

U.S. PATENT DOCUMENTS

| | | | | |
|---|---|---|---|---|
| 5,155,929 A | * | 10/1992 | Vachon | E01H 5/066 37/231 |
| 5,966,845 A | * | 10/1999 | DiGiacomo | E01H 5/066 296/180.1 |
| 2008/0211260 A1 | * | 9/2008 | Hsia | B62D 35/00 296/180.1 |

* cited by examiner

*Primary Examiner* — Joseph D. Pape
(74) *Attorney, Agent, or Firm* — McCormick, Paulding & Huber LLP

(57) ABSTRACT

Aerodynamic drag on a moving vehicle is reduced by adapting the apparent airflow onto a forward-mounted wing, according to vehicle speed. For example, an angle of the wing is adjusted by a motor or actuator. Alternatively, fans at varying speeds provide pilot airflow onto the wing.

7 Claims, 9 Drawing Sheets

SPEED-ADAPTIVE WING FOR DRAG REDUCTION

CROSS-REFERENCE TO RELATED APPLICATION

This application is a continuation-in-part from, and claims the priority of, U.S. patent application Ser. No. 13/785,771 "Speed-Adaptive Wing for Drag Reduction," filed Mar. 5, 2013.

BACKGROUND

Technical Field

The invention relates to vehicles and, more particularly, to structures for reducing aerodynamic drag on moving vehicles.

Discussion of Art

Aerodynamic drag is a long-standing problem relative to wheeled vehicle fuel efficiency. At typical road travel speeds, aerodynamic drag on a wheeled vehicle exceeds tire rolling resistance as a load on the vehicle engine. Thus, engineers have long recognized that it is desirable to reduce the aerodynamic drag of a wheeled vehicle.

Various approaches have been attempted toward reducing aerodynamic drag. Most commonly, wheeled vehicle bodies are streamlined to mitigate flow separation. Flow separation occurs at a place along a vehicle body where a boundary layer of air separates from the surface of the vehicle body due to the boundary layer moving slower than surrounding air. The place where flow separation occurs, will vary based on vehicle speed. Flow separation produces turbulent volumes of air adjacent the vehicle body, and these turbulent volumes effectively increase the cross-section of the vehicle body, thereby increasing drag. Streamlining delays flow separation to a place further along the vehicle body, thereby reducing the turbulent volumes of air and the resultant cross-section of the vehicle body. The effectiveness of streamlining will vary based on vehicle speed.

Efforts have been made to further delay flow separation by introducing forward-mounted spoilers. For example, Elder's U.S. Pat. No. 4,360,232 shows an aerodynamic drag reduction speed-adaptive fairing, which includes a curved inner fairing adjacent an upper rectangular corner at the forward end of a vehicle, together with a spaced air foil member providing high lift characteristics and a convergent path between the members. The combination is said to reduce air resistance and flow separation from top and sides of a vehicle, thus reducing air drag. It is believed that Elder's speed-adaptive fairing is most effective at an optimum speed, whereas at higher or lower speeds the speed-adaptive fairing may actually add to drag.

Another paradigm is to direct air away from high-drag portions of a vehicle. For example, a typical vehicle underbody presents a complex surface with many irregular features, which tend to trap flow and create turbulence between the vehicle and the ground. Accordingly, an air dam is conventionally used to direct oncoming air to either side of the vehicle underbody. For example, GM's U.S. Pat. No. 8,186,746 shows a passively deployable air dam for a vehicle. The passively deployable air dam includes a deployable body, which is mounted by slider bearings onto a pair of slanted shanks. At low vehicle speeds (as might be expected when moving across a surface that included potentially damaging obstacles), springs hold the deployable body in an upward retracted position on the shanks. In the retracted position a lower part of the deployable body is exposed to airflow. At sufficient vehicle speed, the airflow pushes the entire deployable body down the shanks (against the spring forces), toward a downward deployed position. As the deployable body moves down the shanks, additional area is exposed to the airflow, thereby augmenting the downward force to hold the deployable body in its deployed position. Thus, the deployable body is not positionable to any intermediate position between the retracted position or the deployed position.

Another approach was taken by Wong, U.S. Pat. No. 6,926,346, which discloses a deflector panel that is adapted to be disposed on a front section of a vehicle to selectively control airflow about the front section of the vehicle. The control device includes an actuator assembly that is coupled to the deflector panel for linearly moving the deflector panel, such as in vertical direction and/or a fore and aft direction, and for rotating the deflector panel. Preferably, the deflector panel is adjustable while the vehicle is moving. However, Wong's deflector panel does not appear to permit airflow between the panel and the vehicle body. Thus, it cannot act as a wing.

Other solutions have been proposed in the parent application referenced above.

BRIEF DESCRIPTION

In view of the prior solutions to the problem of aerodynamic drag, it seems desirable to have a mechanism for adapting a vehicle's aerodynamic profile according to vehicle speed. Thus, in embodiments of the invention, aerodynamic drag on a moving vehicle may be reduced by providing a forward-mounted wing with one or more ejector fans that are arranged to provide an envelope of laminar airflow over the surfaces of the wing, thereby entraining and re-directing the apparent airflow onto the wing that is caused by vehicle motion. The fans can be adjustable in speed according to the forward speed of vehicle motion, thereby enhancing entrainment of the apparent airflow consistent with increasing speed/intensity of the apparent airflow.

Other embodiments of the invention may provide a speed-adaptive fairing that is mounted at a forward end of a vehicle body, and that includes a wing pivotally attached to the vehicle body and adjustable to modify an apparent airflow over the vehicle body. The wing may be cambered toward its forward surface and may be pivotally connected to the vehicle body by way of a linkage that has an extensible actuator for positively controlling the angle of the wing.

These and other objects, features and advantages of the invention will become apparent in light of the detailed description thereof, as illustrated in the accompanying drawings.

DRAWINGS

DETAILED DESCRIPTION OF THE DRAWINGS

Figure 1:
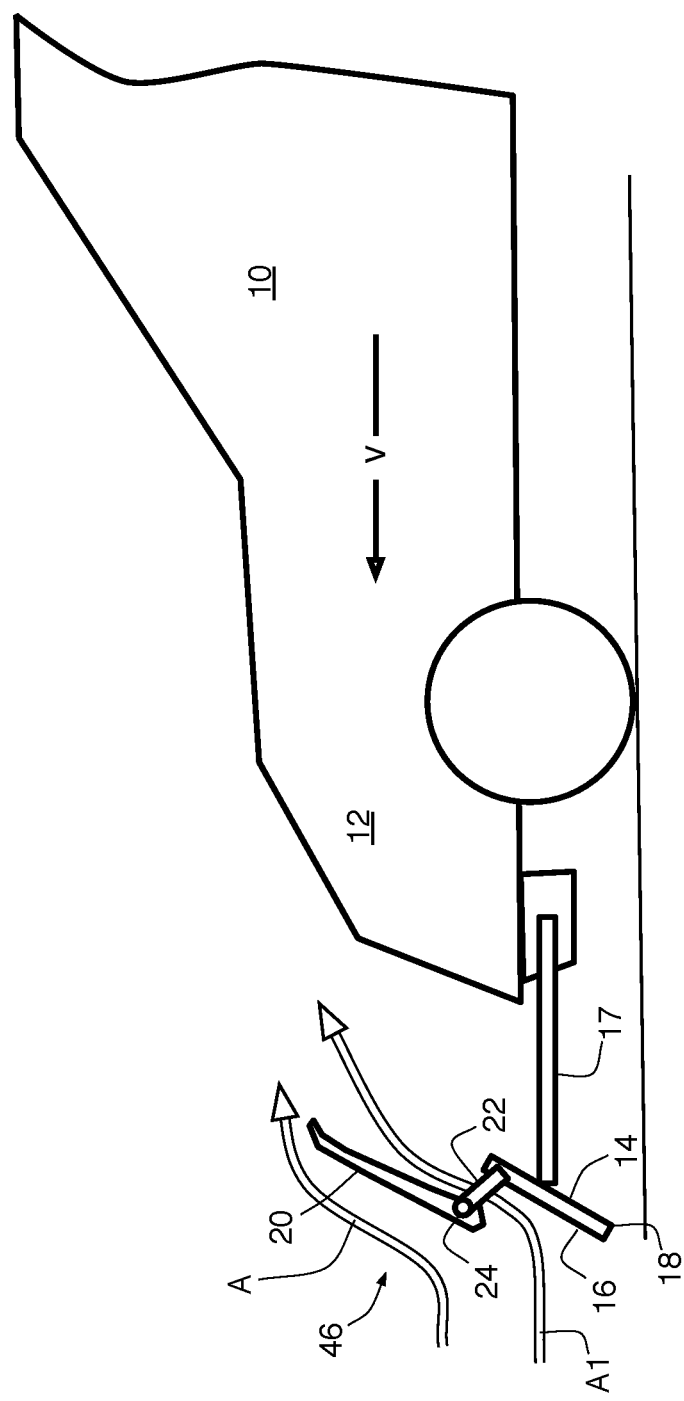
FIGS. 1 and 2 show in schematic view a vehicle with a speed-adaptive fairing according to a first embodiment of the invention.

Referring to FIG. 1, a vehicle 10 typically moves toward its front end 12 with a velocity v, so that an apparent airflow A passes from the front end rearward around the vehicle. According to an embodiment of the invention, an air ram 14 is mounted forward of the vehicle's front end 12 for upwardly deflecting at least a portion of the airflow A ("deflected flow" A1) that otherwise would pass under the vehicle 10. This upward deflection of undercarriage flow reduces aerodynamic drag on the vehicle 10. Preferably the air ram 14 is mounted at least about two feet forward of the vehicle body.

The air ram 14 has a rearwardly-sloping face 16 that is connected by at least one arm 17 to the vehicle body 10. Preferably, the face 16 slopes rearwardly at an angle of between five (5) to forty (40) degrees from vertical; more preferably, at an angle of between five (5) and twenty (20) degrees from vertical; in one embodiment, at an angle of about ten (10) degrees from vertical. Preferably, a lower edge 18 of the face 16 is disposed within about four (4) inches from the ground; more preferably, within about two (2) inches from the ground. For damage avoidance, the arm(s) 17 may be configured to flex upward in case the lower edge 18 contacts debris. Preferably, the face 16 is sufficiently high to prevent any airflow passing over the face 16 and then under the vehicle 10; for example, the face 16 may be at least about eight (8) inches high, more preferably, at least about twelve (12) inches high. Preferably, the face 16 is disposed at least about six (6) inches forward from the front end 12 of the vehicle; more preferably, at least about twelve (12) inches forward; however, preferably no more than about thirty (30) inches forward.

At a forward side and near an upper edge of the air ram 14, a wing 20 is mounted proximal to the sloping face 16 of the air ram 14, on a bracket 22. In many embodiments, the wing 20 is connected with the bracket 22 by a pivot 24. The wing 20 has a leading edge 26 and a trailing edge 28, which define a chord 30 and are connected by an upper surface 32 and a lower surface 34. Preferably the wing 20 is cambered toward the upper surface 32, with the upper surface 32 bulging and the lower surface 34 flattened. More preferably, the lower surface 34 is at least partially concave, having a hollowed portion 38. Exact contours (airfoils) of the wing 20 can be determined according to conventional formulae and algorithms for optimizing lift and drag. Preferably, the wing 20 is disposed forward of the air ram, i.e. at least two feet forward from the vehicle front end 12.

Figure 2:
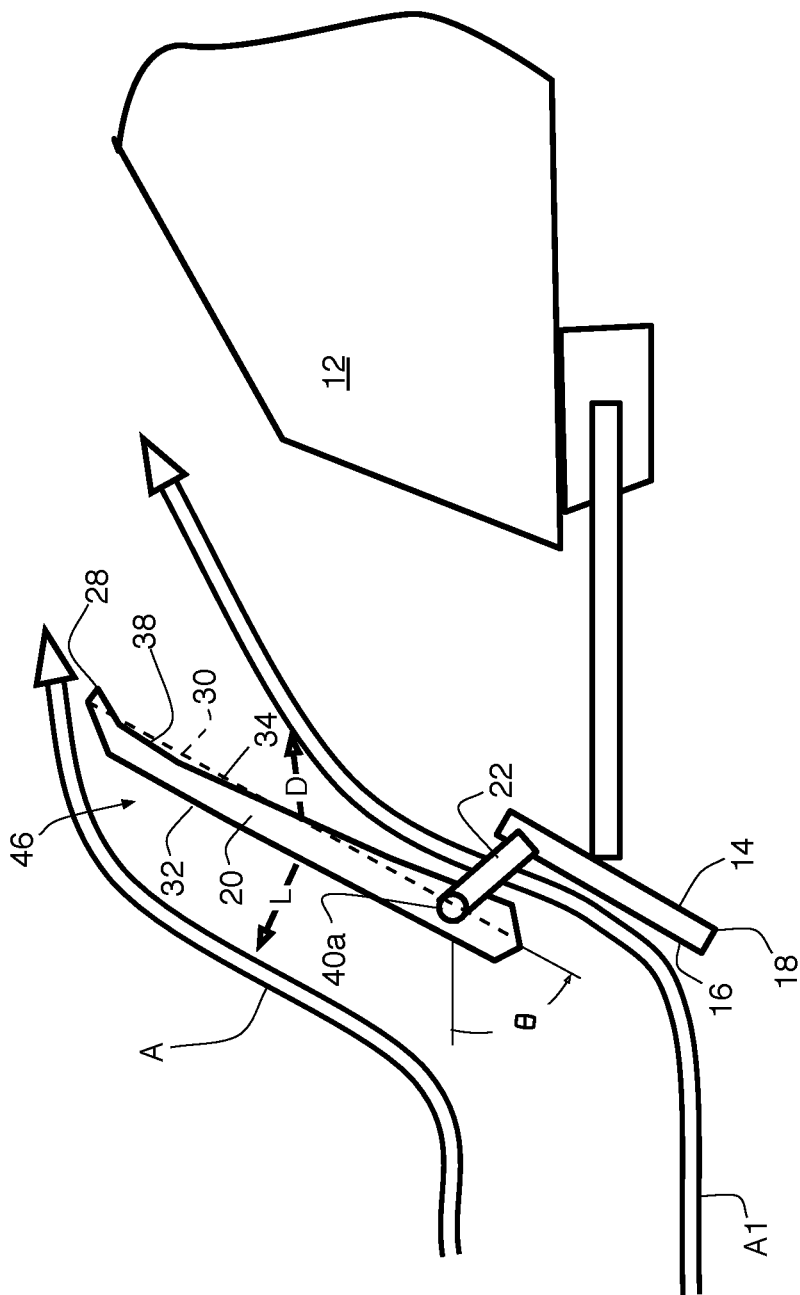

As shown in FIG. 2, forward motion of the vehicle 10 causes the wing 20 to engage an apparent airflow A. More particularly, the wing 20 is mounted with its upper surface 32 facing forward to engage the main part of the apparent airflow A, while the lower surface 34 faces rearward to engage the deflected flow A1 that has been deflected upward by the air ram face 16. Interaction of the airflows A and A1 with the cambered wing 20 produces a lift force L. The lift force L tends to increase with the speed of the airflow A, and the direction of the lift force varies depending on the incidence angle .theta. of the airflow A onto the wing 20, according to conventional aerodynamic principles and equations. The airflow A also induces a generally rearward drag force D on the wing 20. For certain values of the incidence angle .theta., the forward component of the lift force L exceeds the rearward component of the drag force D and thereby reduces total aerodynamic drag of the vehicle 10.

In various embodiments, the pivot 24 can be adjusted to lock the incidence angle .theta., to partially restrain motion of the wing 20, or to permit free motion of the wing. When the wing 20 is permitted to move freely, it tends to rotate around the pivot 24 to set the incidence angle .theta. at a value that balances torque from the lift force L against torque from the drag force D. On the other hand, when the pivot 24 partially restrains motion of the wing 20, the wing rotates only to a position that balances the lift and drag torques against the restraining torque of the pivot. Thus, either free motion or partially restrained motion of the wing 20, can permit "speed adaptation" of the wing to optimize lift and drag as vehicle speed varies. Finally, the pivot 24 can be locked at an incidence angle .theta. that optimizes lift L and drag D for a predetermined speed of the vehicle 10.

Figure 3:
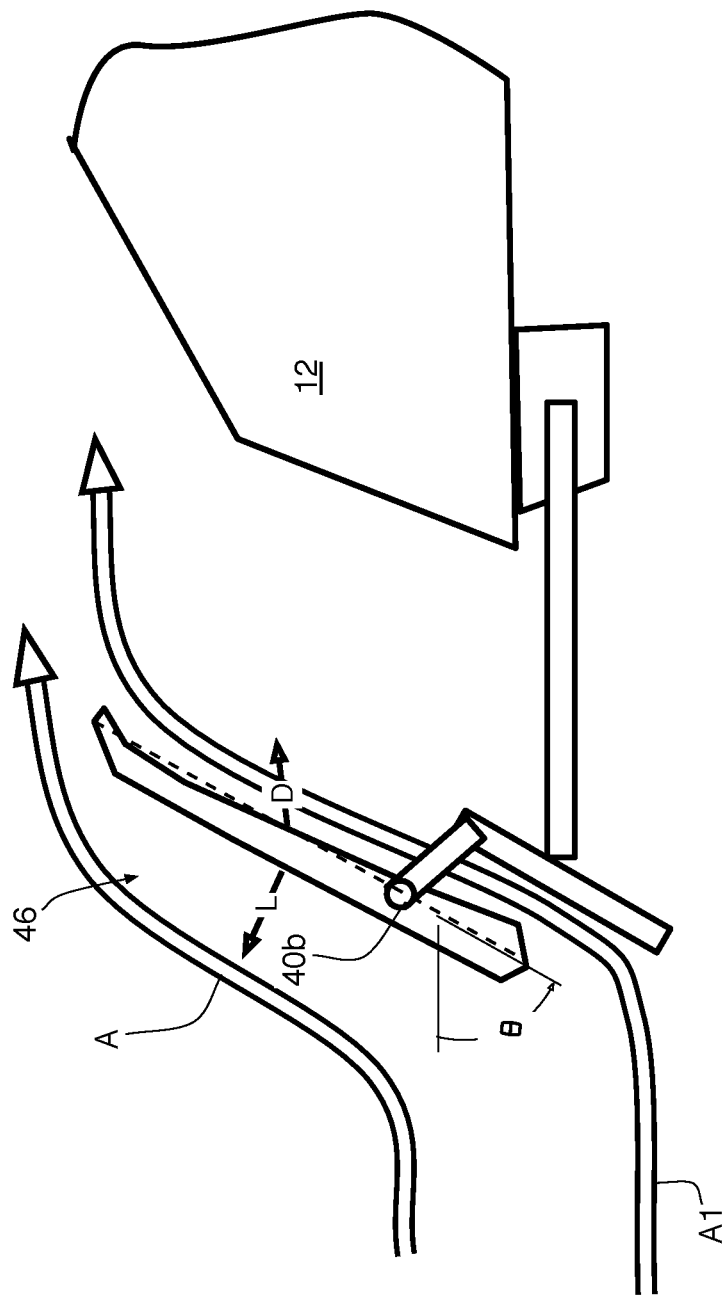
FIG. 3 shows in schematic view a vehicle with a speed-adaptive fairing according to a second embodiment of the invention.
Figure 4:
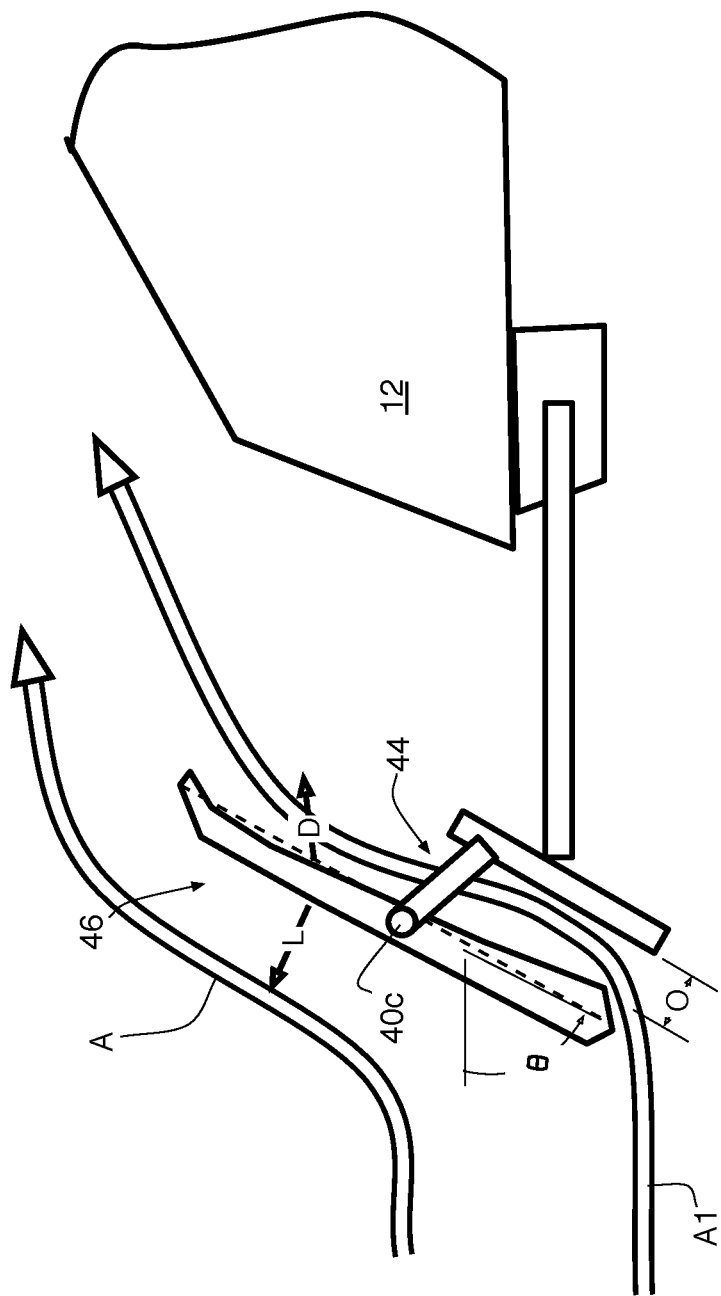
FIG. 4 shows in schematic view a vehicle with a speed-adaptive fairing according to a third embodiment of the invention.

Referring to FIGS. 2-4, the pivot 24 can be positioned at various locations 40*a*, 40*b*, 40*c* along the wing chord 30. Positioning of the pivot 24 along the wing chord 30 also affects the operation and performance of the wing 20. For example, when the pivot 24 is configured to permit free wing motion or to partially restrain motion of the wing 20, the lift/drag trade off and speed adaptation are improved by re-locating the pivot 24 from point 40*c* to point 40*a*. Generally, it is preferred to position the pivot 24 between the leading edge 26 and the wing's center of lift 42.

The bracket 22 supports the pivot 24 at an offset distance O from the ram face 16. Preferably, the offset distance O is between about one (1) inch and about six (6) inches; more preferably, between about one and a half (1.5) inches and about four (4) inches; more preferably, about two (2) inches. The lower surface 34 of the wing 20 and the face 16 of the ram 14 define between them a nozzle 44 through which passes the deflected flow A1. Variation of the offset distance O, and variation of the incidence angle .theta., affect the interaction of the nozzle 44 with the deflected flow A1. Generally, the nozzle 44 induces the deflected flow A1 to flow rearward over the vehicle 10, entraining a part of the main airflow A, thereby delaying flow separation, and thereby reducing the aerodynamic drag of the vehicle 10.

The wing 20 and the ram 14 thereby form a speed-adaptive fairing 46.

Figure 5:
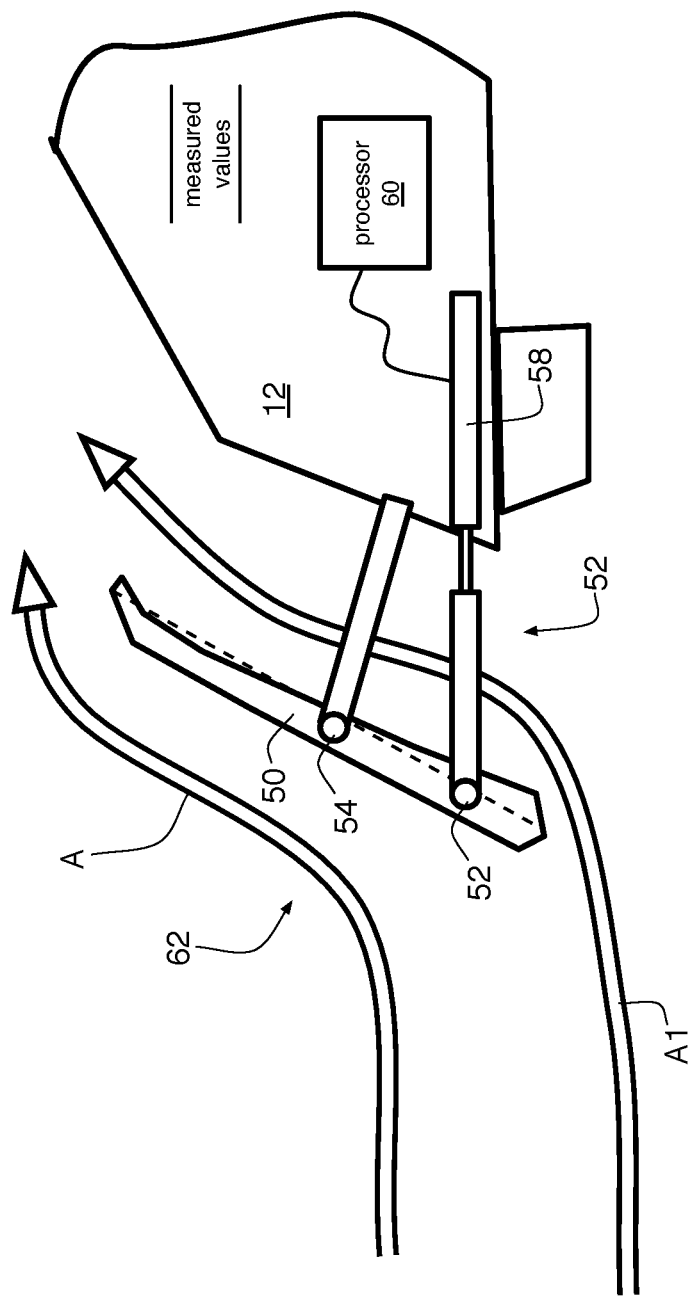
FIG. 5 shows in schematic view a vehicle with a speed-adaptive fairing according to a fourth embodiment of the invention.

FIG. 5 shows a fourth embodiment of the invention, in which a wing 50 is mounted on the vehicle 10 by a linkage 52 that includes first and second pivots 54, 56 as well as an actuator 58. By operation (e.g., extension or retraction) of the actuator 58, the incidence angle .theta. can be adjusted as well as the offset distance O. The actuator 58 is operable under direction of a processor 60, mounted within the vehicle 10, which adjusts the actuator in response to one or measured values including, e.g., a measurement of vehicle speed. (Although the processor 10 is shown within the front end 12, its location need not be so limited; it may be disposed at any place within the vehicle, or, in certain embodiments, the processor may be external to the vehicle and in wireless communication with the actuator 58.) For example, the microprocessor 60 monitors vehicle speed and adjusts the actuator 58 according to a speed/angle lookup table in which the wing is pivoted with reference to the vehicle body as vehicle speed increases. The wing 50 and the linkage 52 thereby form a speed-adaptive fairing 62.

Figure 6:
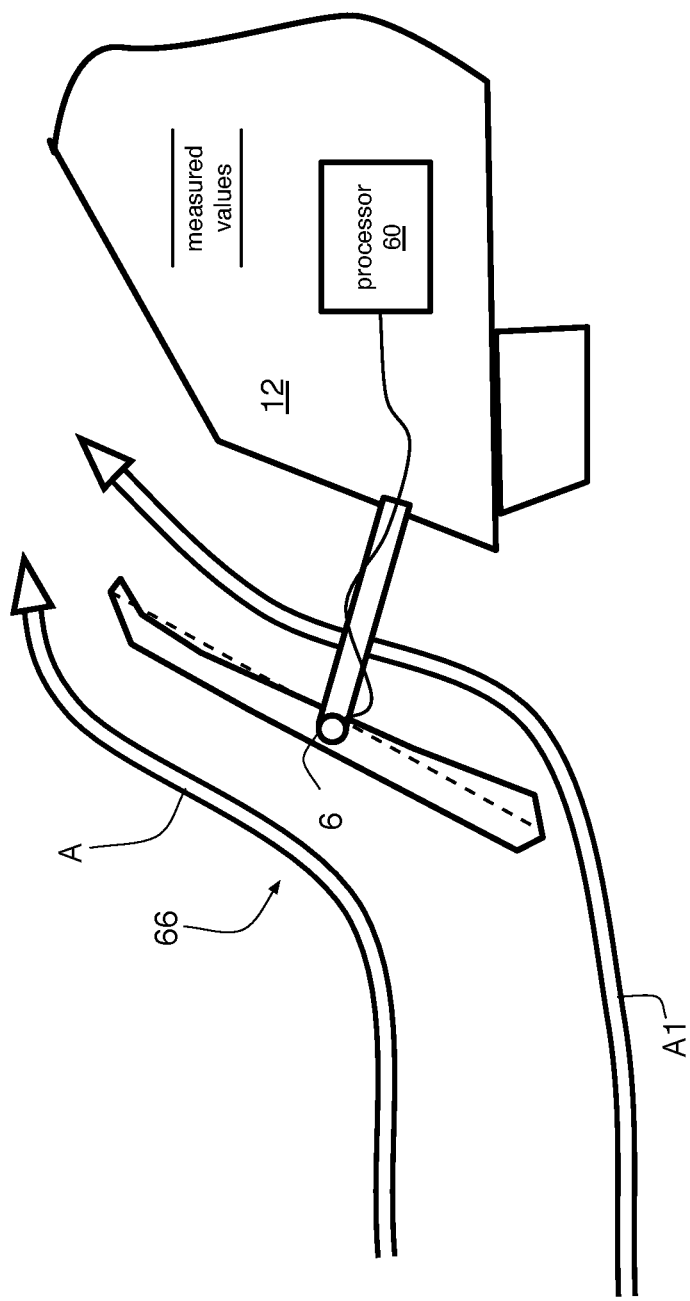
FIG. 6 shows in schematic view a vehicle with a speed-adaptive fairing according to a fourth embodiment of the invention.

In another embodiment, as shown in FIG. 6, the linkage 52 may be replaced by a motorized pivot 64, which again is under control of the processor 60 to adjust the incidence angle .theta. in response to a measured value of, e.g., vehicle speed. The wing 50 and the motorized pivot 64 thereby form a speed-adaptive fairing 66.

Figure 7:
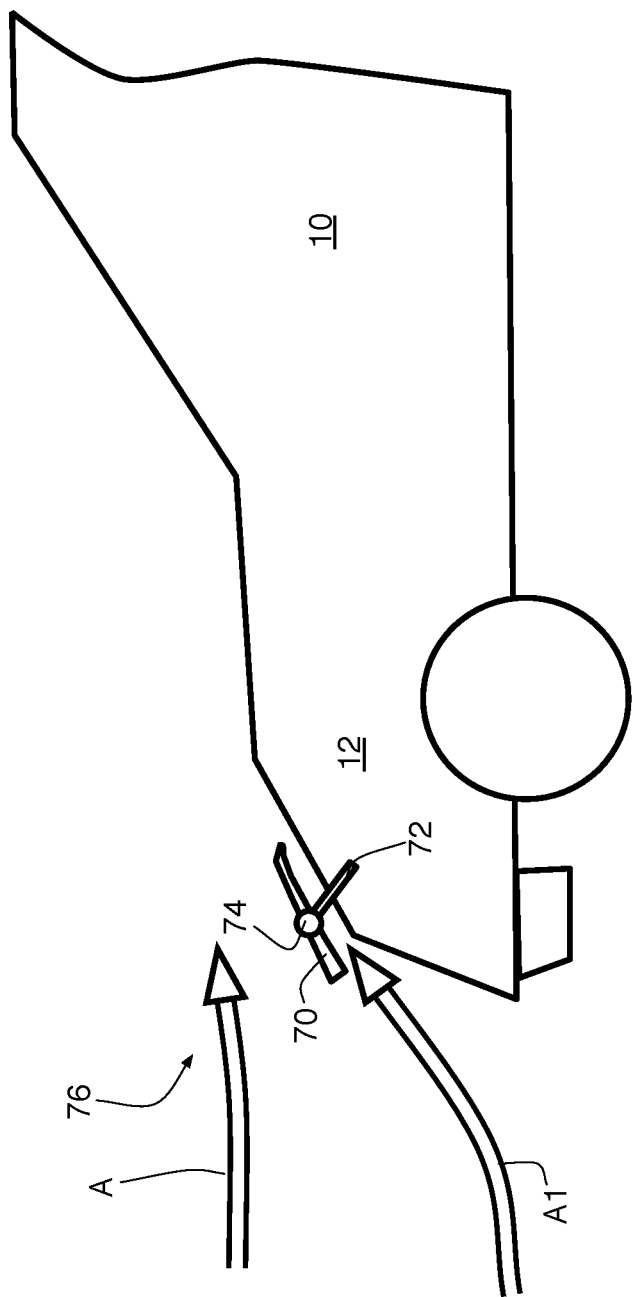
FIG. 7 shows in schematic view a vehicle with a speed-adaptive fairing according to a fifth embodiment of the invention.

FIG. 7 shows another embodiment, in which a wing 70 is mounted at an upper forward corner of the vehicle body 10 by a bracket 72 and pivot 74. The wing 70 self-adjusts in response to the apparent airflow, thereby providing a speed-adaptive fairing 76.

Figure 8:
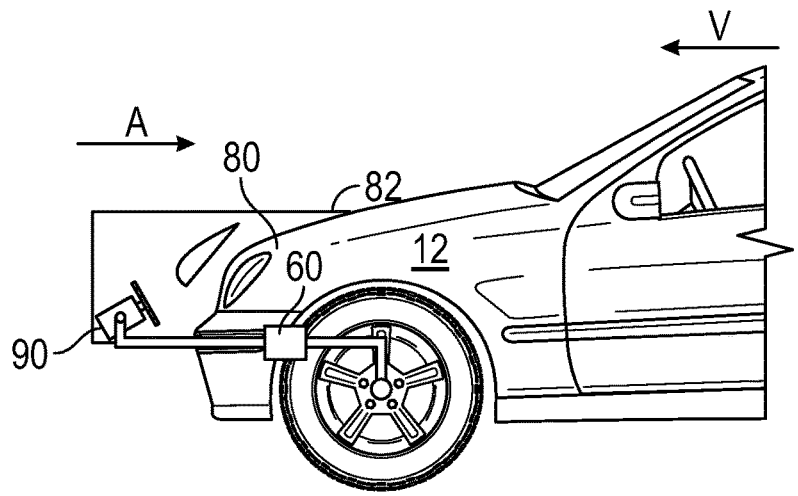
FIG. 8 shows in side schematic view a vehicle with a speed-adaptive fairing according to a sixth embodiment of the invention.
Figure 9:
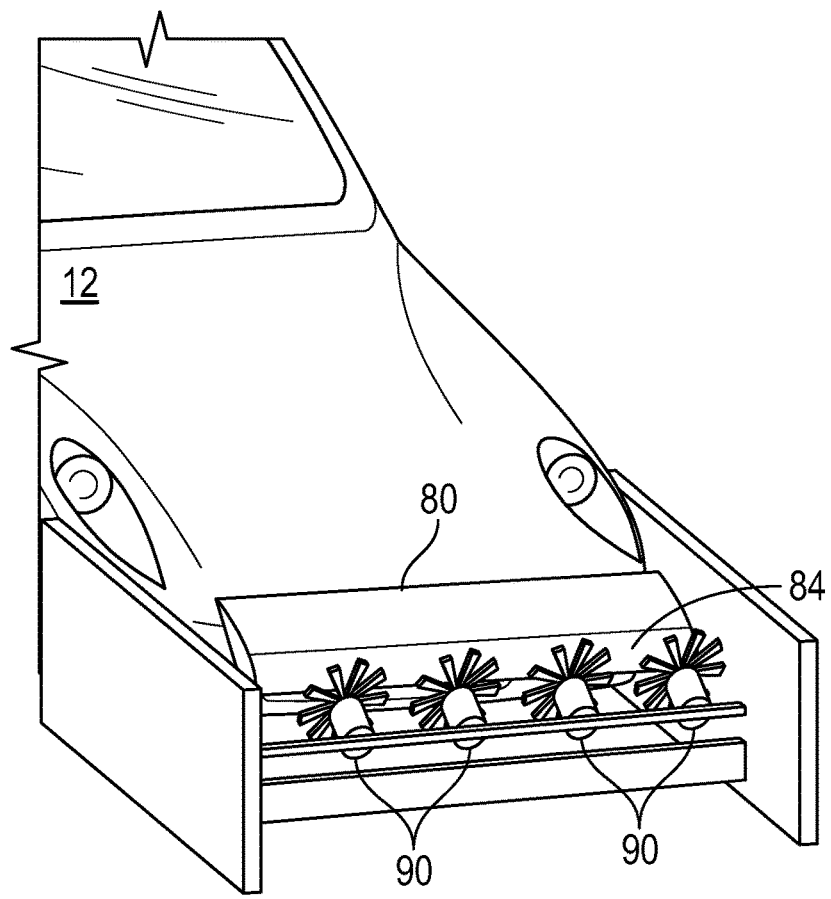
FIG. 9 shows in perspective view a vehicle with a speed-adaptive fairing according to a seventh embodiment of the invention.
Figure 10:
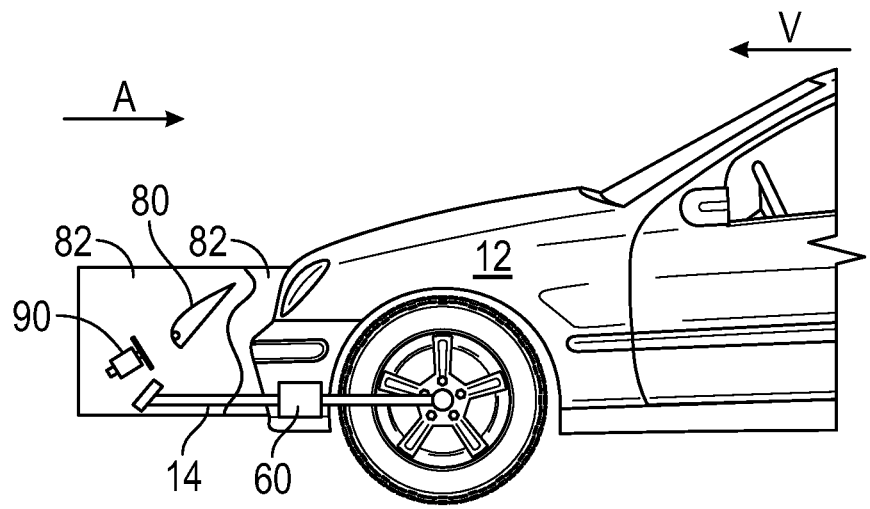
FIG. 10 shows in side schematic view the vehicle with the speed-adaptive fairing according to FIG. 9.
Figure 11:
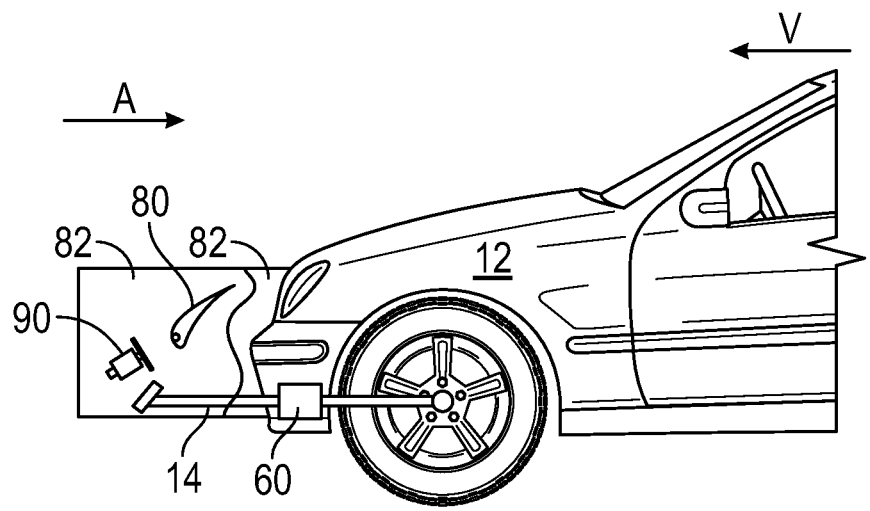
FIG. 11 shows in side schematic view a vehicle with a speed-adaptive fairing according to an eighth embodiment of the invention.

FIG. 8 shows in side schematic view a sixth embodiment, in which a wing 80 is mounted between side panels 82 onto the vehicle body 10. FIG. 9 is a perspective schematic view of a seventh embodiment, in which the wing 80 is mounted forward of the vehicle body with an air ram below the wing to direct air upward between the wing and the vehicle body. FIG. 10 is a side schematic view of FIG. 9. FIG. 11 is a side schematic view of an eighth embodiment in which the wing has a curved trailing edge.

According to the embodiments of FIGS. 8-11, one or more fans 90 are mounted proximate the wing 80, in order to direct a pilot airflow onto the wing 80. The fans 90 can be angled to direct the pilot airflow onto, above, or below the leading edge 84. The fans 90 can be adjustable according to speed of the vehicle, so as to maintain apparent airflow against the leading edge 84 near constant, up to a maximum design speed. For example, as vehicle speed increases there is a concomitant rearward change in apparent airflow A. The fans 90 can be tilted upward by conventional means (e.g. by an actuator 58) so as to cancel this change in apparent airflow. Alternatively or additionally, the fans 90 can be run faster as vehicle speed increases. The fans 90 (and the optional actuator 58) can be controlled by a microprocessor 60 according to a vehicle speed/fan speed lookup table, in which the fan speed increases as the vehicle speed increases.

The various components may be fabricated from convenient and suitable materials, as will be apparent to skilled workers.

Although this invention has been shown and described with respect to the detailed embodiments thereof, it will be understood by those skilled in the art that various changes in form and detail thereof may be made without departing from the spirit and the scope of the invention.

What is claimed is:
1. A vehicle comprising:
a vehicle body;
a wing pivotally attached at a forward end of the vehicle body and disposed to modify an apparent airflow over the vehicle body;
a fan attached at the forward end of the vehicle body and disposed to provide laminar airflow over the wing when energized; and
a microprocessor configured to monitor vehicle speed and to adjust the fan according to a vehicle speed/fan speed lookup table.
2. The vehicle of claim 1 wherein the fan is adjusted by varying its speed.
3. The vehicle of claim 1 wherein the fan is adjusted by tilting it relative to the wing.
4. The vehicle of claim 1 wherein at least the wing is mounted between side panels that protrude from the vehicle body.
5. The vehicle of claim 1 wherein the wing and the fan are mounted between side panels that protrude from the vehicle body.
6. A method for reducing aerodynamic drag on a vehicle, comprising:
mounting a wing onto a forward end of the vehicle at least two feet ahead of the vehicle body; and
adjusting the apparent airflow onto the wing, in response to a change of vehicle speed, in order to reduce aerodynamic drag, wherein the apparent airflow is adjusted by operation of a fan at variable speed to provide a varying pilot airflow onto the wing.
7. A method for reducing aerodynamic drag on a vehicle, comprising:
mounting a wing onto a forward end of the vehicle at least two feet ahead of the vehicle body; and
adjusting the apparent airflow onto the wing, in response to a change of vehicle speed, in order to reduce aerodynamic drag, wherein the apparent airflow is adjusted by tilting a fan that provides a varying pilot airflow onto the wing.

* * * * *